UNITED STATES PATENT OFFICE.

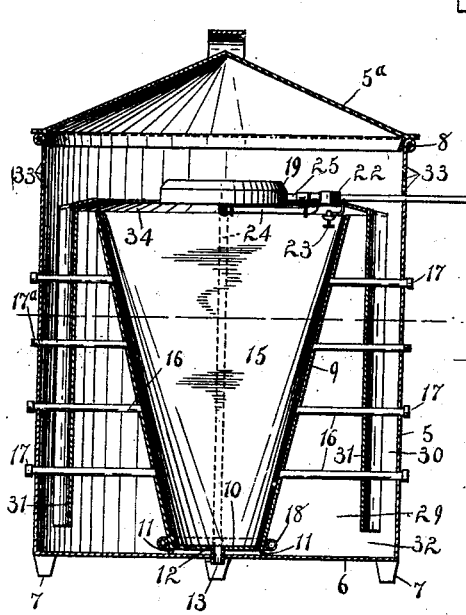

GEORGE V. ANDREWS, OF HARVARD, ILLINOIS.

WATER-HEATER.

933,736.

Specification of Letters Patent. Patented Sept. 14, 1909.

Application filed May 6, 1908. Serial No. 431,077.

*To all whom it may concern:*

Be it known that I, GEORGE V. ANDREWS, a citizen of the United States, residing at Harvard, in the county of McHenry and State of Illinois, have invented certain new and useful Improvements in Water-Heaters, of which the following is a specification.

My invention relates to water heaters and has particular reference to that class of devices designed to be submerged in the water to be heated.

The chief objects of the improvements which form the subject matter of this application are: to provide a simple apparatus for accomplishing the purposes in view; to furnish an appliance that will be equally efficacious under variations in the water level, and to provide a water heater so arranged as to apply the available heat in a manner best suited to produce the maximum effect.

Further objects of this apparatus are to provide means for utilizing the surplus or waste heat for other purposes than that of heating water; to furnish a casing of special construction through which the water will freely circulate thus causing an approximately uniform distribution of the heated water, and to produce a portable device for the purposes set forth and one that can be manufactured economically.

While the devices herein described are particularly intended to be used for heating water in tanks for the use of stock on farms and ranches and is arranged for that particular application, it will be readily seen that the same appliance may be utilized for raising the temperature of water in any vessel available and for other purposes.

I accomplish the desired results by the employment of the apparatus illustrated in the accompanying drawing forming a part of this application, and in which:—

Figure 1 is a vertical longitudinal section on the line 1—1 of Fig. 2; Fig. 2 is a top plan view with the cover removed, and Fig. 3 is a fragmentary view showing the application of an auxiliary utensil.

Referring to the details of the drawing the numeral 5 indicates an external shell or casing, cylindrical in form, open at the top and having a bottom 6, to which are attached feet 7, thus raising the structure above the bottom of the tank (not shown). The upper margin of said casing 5 is furnished with a reinforcing wire 8, common in such structures, and is supplied with a cover 5$^a$. Located concentrically with the outer casing is an inner casing 9, the walls of which flare outwardly from below upward. The lower end of said inner casing 9 is circular and provided with a bottom plate 10. This casing is supported by lugs 11, which rest upon the bottom 6 of the external shell. The bottom plate 10 has a central opening 12 in which is inserted a short length of pipe 13 which passes through an orifice in the bottom of the outer casing. This pipe is secured by soldering or in other suitable manner to the plates through which it passes in order to form water tight joints therebetween. The upper end of the inner casing 9 assumes a rectangular shape, as shown in Fig. 2 and the corners 14 of the rectangle engage the inner face of the casing 5 at points below the upper rim, so that the inner casing is firmly supported laterally. The interior of the inner casing or water chamber 15 communicates with the outside of the outer casing through the medium of series of tubes 16 placed in diametrically opposite vertical rows at spaced intervals. The outer ends of said tubes project beyond the casing wall and are supplied with removable caps 17, held frictionally, or having threaded connection as shown at 17$^a$ in the drawing. I prefer to form the casings thus described of galvanized sheet iron, and use the same material wherever practicable throughout the entire structure.

I prefer to employ gasolene for fuel, and have shown the devices adapted to employ this oil, although illuminating or other gas may be used when more convenient. Two burners are installed, both in ring form. A main burner 18 surrounds the lower end of the inner casing 9 and an auxiliary burner 19 is concentrically located above the said casing. An oil reservoir 20 is connected by an oil pipe 21 with a generator 22 below which is located the generating jet 23. The generated gas then passes through a gas pipe 24 to the main burner 18 a branch 25 supplying the auxiliary burner 19. A suitable valve 26 controlled by a hand wheel 27 regulates the supply of gas to the burners, and a second valve 28 cuts off the gas supply to the burner 19 when not in use.

The space 29, between the inner and outer casings forms a combustion chamber, and the burner 18 which is located at the bottom of this chamber is supplied with air to support combustion through pipes or ducts 30 formed by curved plates 31 attached to the inner face of the outer casing 5. These ducts two in number are placed diametrically opposite each other and have openings 32 at the bottom communicating with the chamber 29. The outer casing is furnished with a number of holes 33 located adjacent to the ducts 30 to supply cold air thereto. Just above the inner casing is placed a hot air deflecting ring 34, inclined at an angle so that the heated air rising from the main burner 18 and passing along the flaring sides of the inner casing will be forced toward the center of the structure. This ring fits tightly around the outer margin where it engages the wall of the outside casing, being cut away at opposite points to allow the passage of the cold air ducts 30.

The upper auxiliary burner 19 is intended to be used in very cold weather and when a large quantity of water is to be heated. It may also be employed for other purposes such as cooking feed, warming milk, or quickly producing very hot water for scalding milk cans. For such uses a special utensil or cooker 35 is provided. The bottom 36 of the cooker is contracted so that the body of the vessel will rest upon the reinforced margin 8 of the outer casing, and as the top of the cooker is of the same diameter as said casing the same cover 5ª may be used for both, as shown in Figs. 1 and 3.

The details of construction having thus been disclosed I will now describe the manner in which the apparatus is employed. To warm the water in a stock tank for drinking purposes, the reservoir having been supplied with the requisite quantity of fuel oil, the entire apparatus is placed in the water to be heated, the feet 7 resting upon the bottom of the tank or suitable support raised above the tank bottom (not shown in the drawing). The water level must be at some point (Fig. 1) below the holes 33 in the outer casing, and the caps 17 removed from those tubes 16 which are immediately below the water level, as shown at 17ª. As soon as the heater is placed in the tank the water will pass through the pipe 13 and fill the interior of the inner casing or water chamber to a level with the water outside. The gas having been generated in the usual manner and the lower or main burner 18 ignited, the cold air will pass down the ducts 30 to supply combustion and the air in the combustion chamber will become heated and ascend, as aforesaid, along the flaring inner casing wall, thus getting the maximum effect of the hot air. As the water within the inner casing becomes warm it will rise and pass out through the open pipes 16, cold water entering at the lower orifice 13 to take its place. This circulation of the water will continue so long as the conditions remain unchanged.

The application of the auxiliary burner will be evident upon inspection of Fig. 3 which shows the relation of the auxiliary burner and the feed cooker.

It will be seen that by regulating the flame of the burner to suit weather conditions the water in a tank may be kept at practically a uniform temperature provided the water level does not recede below the open tube. When this does take place the exposed tube must be closed and the lower tube opened to obtain the proper circulation. If desired all the tubes 16 may be closed in which case the water in the interior of the inner casing will be heated to a much higher degree owing to its being confined the only communication with the tank being in this case through the pipe 13.

Having thus described my invention, what I claim as new, is:—

1. A water heater, comprising an outer combustion chamber, and an inner water chamber, the walls of the water chamber flaring outwardly from below upward, a burner in the combustion chamber at the base of the water chamber, a vertical centrally arranged tube connecting the water chamber with the exterior of the outer chamber, a plurality of horizontal tubes connecting the water chamber with the exterior of the combustion chamber, said tubes being arranged at spaced intervals in different planes and having removable closures, a plurality of air ducts arranged diametrically opposite upon the outer wall of the combustion chamber, and an annular deflecting ring attached at its periphery to the outer wall of the said combustion chamber, and extending partially over the water chamber.

2. In a water heater, an outer casing, a cover supported on said casing, an inverted frusto-conical water chamber arranged within said casing, an annular burner surrounding the base of said chamber and in close proximity thereto, a burner arranged at the top of said water chamber, means for conducting water to and from said water chamber and means for supplying said burners with fuel.

In testimony whereof I affix my signature in the presence of two witnesses.

GEORGE V. ANDREWS.

Witnesses:
 P. E. SAUNDERS,
 ELMER HAMMOND.